United States Patent [19]
Farrington et al.

[11] Patent Number: 6,166,927
[45] Date of Patent: Dec. 26, 2000

[54] PUSH-PULL POWER CONVERTER CIRCUIT

[75] Inventors: Richard W. Farrington, Heath; William Hart, Plano, both of Tex.

[73] Assignee: Ericsson Inc., Research Triangle Park, N.C.

[21] Appl. No.: 09/361,023

[22] Filed: Jul. 23, 1999

[51] Int. Cl.[7] .................................................. H02M 3/335
[52] U.S. Cl. ............................................................. 363/25
[58] Field of Search .................................. 363/25, 26, 24

[56] References Cited

U.S. PATENT DOCUMENTS

| | | | |
|---|---|---|---|
| 5,488,554 | 1/1996 | Green | 363/25 |
| 5,883,793 | 3/1999 | Farrington | 363/25 |
| 5,959,438 | 9/1999 | Jovanovic et al. | 363/25 |

OTHER PUBLICATIONS

*A Novel High–Input–Voltage, High Efficiency and Fast Transient Voltage Regulator Module—Push Pull Foward Converter* by Xunwei Zhou, Bo Yang, Luca Amoroso, Fred C. Lee and Pit–leong Wong, Virginia Power Electronics Center; The Bradley Department of Electrical Engineering, Virginia Polytechnic Institute and State University, Blacksburg, VA, Jun., 1999 IEEE, pp. 279–283.

*Primary Examiner*—Shawn Riley
*Attorney, Agent, or Firm*—Jenkens & Gilchrist

[57] ABSTRACT

A push-pull converter for converting an input voltage to a selectable output voltage is disclosed. The push-pull converter includes a pair of primary switches and a pair of primary windings of a transformer. The voltage stress across the primary switches is regulated by means of a clamp capacitor. The clamp capacitor clamps the voltage of the primary switches during the reset of the primary windings of the transformer. An alternate embodiment is also disclosed in which the voltage stress across the primary switches is regulated by means of two clamp capacitors. The clamp capacitor clamps the voltage of the primary switches during the reset of the primary windings of the transformer. The clamp capacitors extend the transformer reset period to include the lagging dead time for the corresponding switches, as well as the complementary powering stage. Current in the output section during the dead times is permitted by means of an additional diode, therein.

19 Claims, 5 Drawing Sheets

PUSH-PULL POWER CONVERTER CIRCUIT

BACKGROUND OF THE PRESENT INVENTION

1. Field of the Invention

The present invention relates to electronics, and more particularly to power supply systems.

2. Description of Related Art

Digital electronic devices often require a number of direct current voltage (DC Voltage) for proper operation. However, the devices usually receive power from a single or limited number of power sources (e.g., a power outlet or battery) which do not necessarily correspond to the required DC voltages.

Accordingly, a converter circuit is placed between the electronic device and the power source which receives an input DC voltage and produces a selectable DC voltage output. One type of converter is known as a switch mode power supply. Switch mode power supplies are characterized by the use of a high frequency switch with a varying duty cycle to maintain the output voltage.

A popular type of switch mode power supply is known as a Push-Pull converter. Referring now to FIG. 1, there is illustrated a diagram of Push-Pull converter, designated generally by the reference numeral 100. The Push Pull converter 100 includes an input node VIN for receiving an input voltage and an output node VOUT for supplying a steady selectable DC voltage to an electronic device, generally referred to as a load.

The Push-Pull converter 100 includes a primary circuit, designated generally by the reference numeral 100a, and an output section, generally designed by the reference numeral 100b, magnetically coupled together by a transformer T1. Transformer T1 includes primary windings T1a, and secondary windings T1b, in which a current passing through the primary windings T1a induces a proportional current through the secondary windings T1b, as is well understood to one skilled in the art.

The primary circuit 100 includes switches Q1 and Q2 which can include, for example, a transistor. The switches Q1, Q2 have respective gates G1 and G2, sources S1 and S2, and drains DR1 and DR2, in which the source and drain operate are short-circuited when a voltage exceeding the threshold voltage is applied across the gate and drain, and an open-circuit otherwise.

The output section 100b includes respective diodes D1 and D2, which permit current flow in one direction, but block current flow in the opposite direction. The diodes D1, D2 are schematically represented by an arrow which points in the direction in which current is permitted to flow. The condition where the diodes D1, D2 permit current flow is known as forward biasing, while the condition where diodes block current flow is known as reverse biasing. The output section 100b also includes an inductor L1 and an output capacitor C2 in what is known in the art as an LC filter network.

A voltage is applied across the gate G1, G2 and drain terminals DR1, DR2 by a gate drive circuit GDC, as illustrated in FIG. 1. The gate drive circuit GDC applies a square wave with less than 50% duty cycle to each switch Q1, Q2, where the square wave applied to Q2 is 180 degrees out of phase with the square wave applied across Q1.

When switch Q1 switches on, current flows through the upper half of transformer T1's primary winding T1a and the magnetic field in the transformer T1 expands. As is known in the art, the expanding magnetic field in the transformer T1 induces a voltage across the T1 secondary winding T1b. The polarity is such that diode D2 is forward biased and diode D1 reverse biased. Diode D2 conducts and charges the output capacitor C2 via L1. When switch Q1 turns off, the magnetic field in the transformer T1 collapses, and after a period of dead time, switch Q2 conducts, and current flows through the lower half of the primary winding T1a and the magnetic field in the transformer T1 expands. Now, however, the direction of the magnetic flux is opposite to that produced when switch Q1 conducted. The expanding magnetic field induces a voltage across the secondary winding T1b, the polarity of which is such that diode D1 is forward biased and diode D2 reverse biased. Diode D1 then conducts and charges the output capacitor C2 via L1. After a period of dead time, switch Q1 conducts and the cycle repeats.

As understood by those skilled in the art, the afore-described push pull converter 100 is well suited for medium to high power purposes. However, the push pull converter 100 also has a number of disadvantages. For example, the voltages across switches Q1 and Q2 are not tied to VIN, i.e., the input voltage, resulting in increased voltage stress across the respective switch. Furthermore, push pull converters 100 experience parasitic oscillations in the primary circuit 100a during the dead time due to the interaction of the capacitance of the switches Q1, Q2 and leakage inductance.

Accordingly, it is an object of the present invention to limit the voltage stress across the switches in the primary circuit.

It is also an object of the present invention to reduce the parasitic oscillations in the primary circuit.

SUMMARY OF THE INVENTION

The present invention is directed to a push-pull converter for converting an input voltage to a selectable output voltage at an output terminal. The push-pull converter includes a pair of primary switches and a pair of primary windings of a transformer. The voltage stress across the primary switches is regulated by means of a clamp capacitor. The clamp capacitor clamps the voltage of the primary switches during the reset of the primary windings of the transformer.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF PREFERRED EMBODIMENTS OF THE PRESENT INVENTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
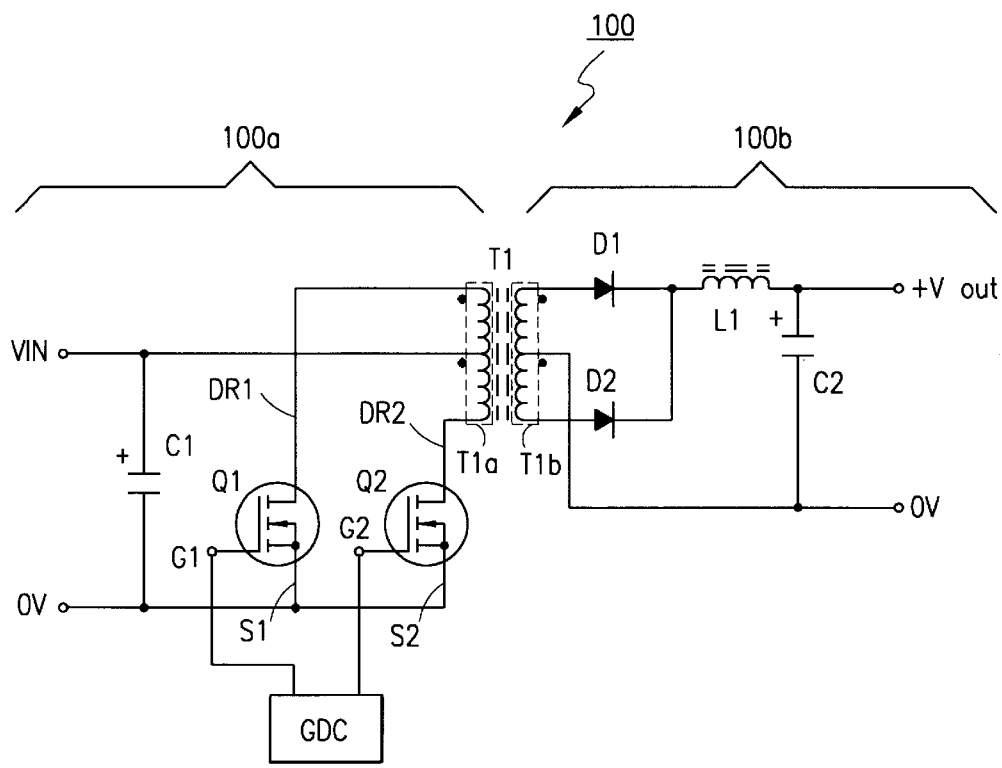
FIG. 1 is a diagram of a conventional push-pull converter.
Figure 2:
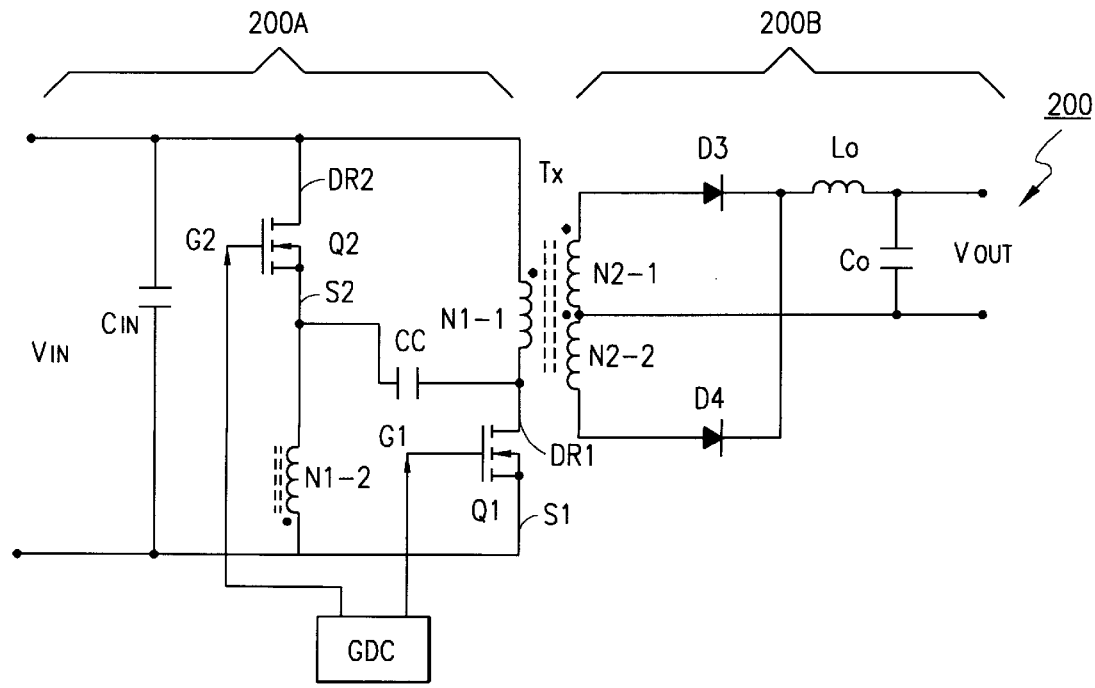
FIG. 2 is a diagram of a push-pull converter employing the principles of the present invention.

Referring now to FIG. 2, there is illustrated a diagram of a push-pull converter, designated generally by the reference numeral 200, embodying the present invention. The push-pull converter 200 includes a primary circuit 200A and an output section 200B. The primary circuit 200A includes an input terminal VIN connectable to an input voltage. An input capacitor CIN is placed across the input terminal VIN to filter the input. Additionally the push-pull converter 200 includes a first switch Q1 connected in series to a first primary winding of a transformer N1-1 across the input terminal VIN and a second switch Q2 connected in series with a second primary winding of a transformer N1-2 also connected across the input terminal VIN. The first and second switches Q1 and Q2 and the first and second primary windings of transformer N1-1 and N1-2 are disposed such that first switch Q1 is diagonally opposite the second switch Q2 and the first primary winding of transformer N1-1 is diagonally opposite the second primary winding of the transformer N1-2. Each switch includes a respective gate terminal G1, G2, a source terminal S1, S2 and a drain terminal DR1, DR2 in which the source and drain are short-circuit when a voltage exceeding the threshold voltage is applied across the gate and drain, and an open-circuit otherwise. A voltage is applied across the gate G1, G2 and drain terminals DR1, DR2 by a gate drive circuit GDC.

With further reference to FIG. 2, a clamp capacitor CC is connected across the drain DR1 of the first switch Q1 and the source S2 of the second switch Q2. By connecting a clamp capacitor CC in the foregoing manner, a path is formed including the first switch Q1 and the second switch Q2 across the input terminal VIN. A path is also formed including the first primary winding of transformer N1-1 and the second primary winding of transformer N1-2 across the input terminal VIN.

The clamp capacitor CC is charged to a voltage equal to the input voltage and clamps the maximum voltage stress across the switches Q1, Q2 to approximately twice the voltage across the input terminal VIN. During the dead time stage, the clamp capacitor CC is charged through the voltage across the input terminal VIN and the two primary windings of transformer N1-1, N1-2, thereby recovering the energy stored in the leakage inductance. The charging of the clamp capacitor CC during the dead time and the fact that the secondary windings of the transformer N2-1, N2-2 are shorted allow for the load current to charge the clamp capacitor CC and reduces the interaction of the output capacitance of the switches Q1, Q2 and the leakage inductance of the primary windings of transformer N1-1, N1-2. During both of the power stages, either switch Q1 or Q2 are on, the clamp capacitor CC is discharged through the active switch and the inactive primary winding of transformer N1-1 or N1-2. When the first switch Q1 is on, the primary winding of transformer N1-2 resets capacitor CC. When the second switch Q2 is on, the primary winding of transformer N1-1 resets capacitor CC. During either power interval, the clamp capacitor CC discharges energy to the output section 200B.

The output section 200B includes diodes D3, D4 and secondary windings N2-1, N2-2. Diode D3 is connected in series with primary winding N2-1 while diode D4 is connected in series with primary winding N2-2, such that the diode D3, primary winding N2-1 series pair is parallel to the diode D4, primary winding N2-2 series pair. The output section 200B also includes an inductor LO and an output capacitor CO as an LC filter network, such that output capacitor CO is connected across output terminal VO.

Figure 3:
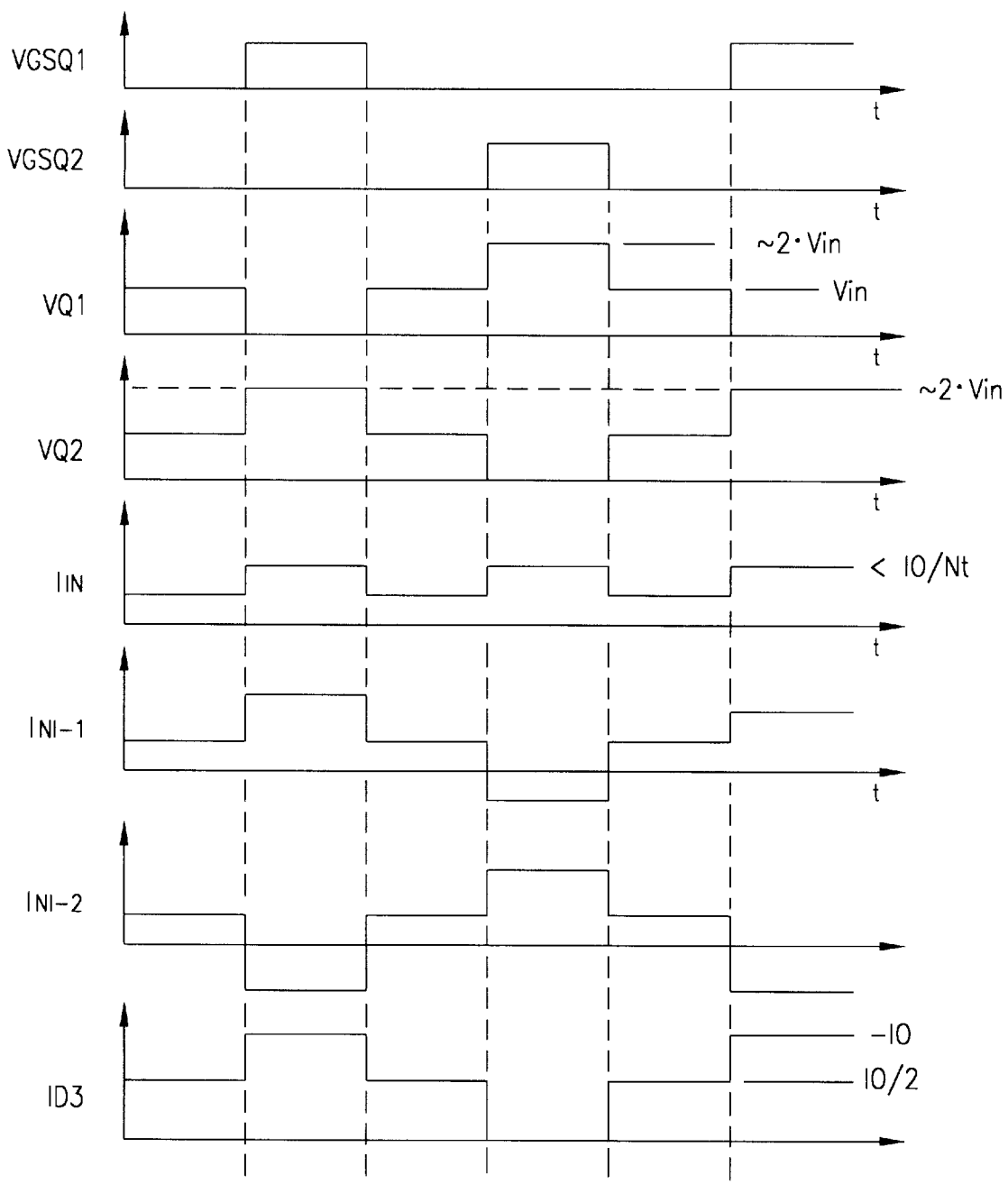
FIG. 3 is a graph of wave forms describing the operation of the push-pull converter of FIG. 2, where the clamp capacitor has a relatively large capacitance.

Referring now to FIG. 3, there are illustrated wave forms for the push-pull converter 200 of FIG. 2, where the clamp capacitor CC has a large capacitance (approximately 5 to 10 $\mu$F for a 100 KHz switching frequency). The voltage applied to switches Q1 and Q2 by the gate drive circuit GDC are represented by waveforms VGSQ1 and VGSQ2. Due to the clamp capacitor CC, the voltage stress across switches Q1, Q2 (represented by waveforms VQ1, VQ2) is clamped to twice the input voltage. Where the clamp capacitor CC has a large capacitance, the charging and discharging time constants are large enough resulting in constant charging and discharging currents with a value dependent on the capacitance of the clamp capacitor CC, the leakage inductance and the source impedance. In the extreme case where the clamp capacitor CC acts like a voltage source, the load current splits evenly between the input source and the clamp capacitor CC reducing the peak current through both primary windings N1-1, N1-2 to half the reflected load current. The current through primary windings N1-1, N1-2 (represented by waveforms IN1-1 and IN1-2, respectively) is the current through the corresponding switch Q1 or Q2 minus the current through the clamp capacitor CC. Therefore, the current through the primary windings of the transformer N1-1, N1-2 have a stair-step shape similar to the current in the output section 200B (represented by waveform ID3 where IO represents the steady-state current across output capacitor CO). The input current is represented by waveform IIN (where Nt represents the effective transformer turns retation between the primary windings N1-1, N1-2 and the secondary windings N2-1, N2-2).

Figure 4:
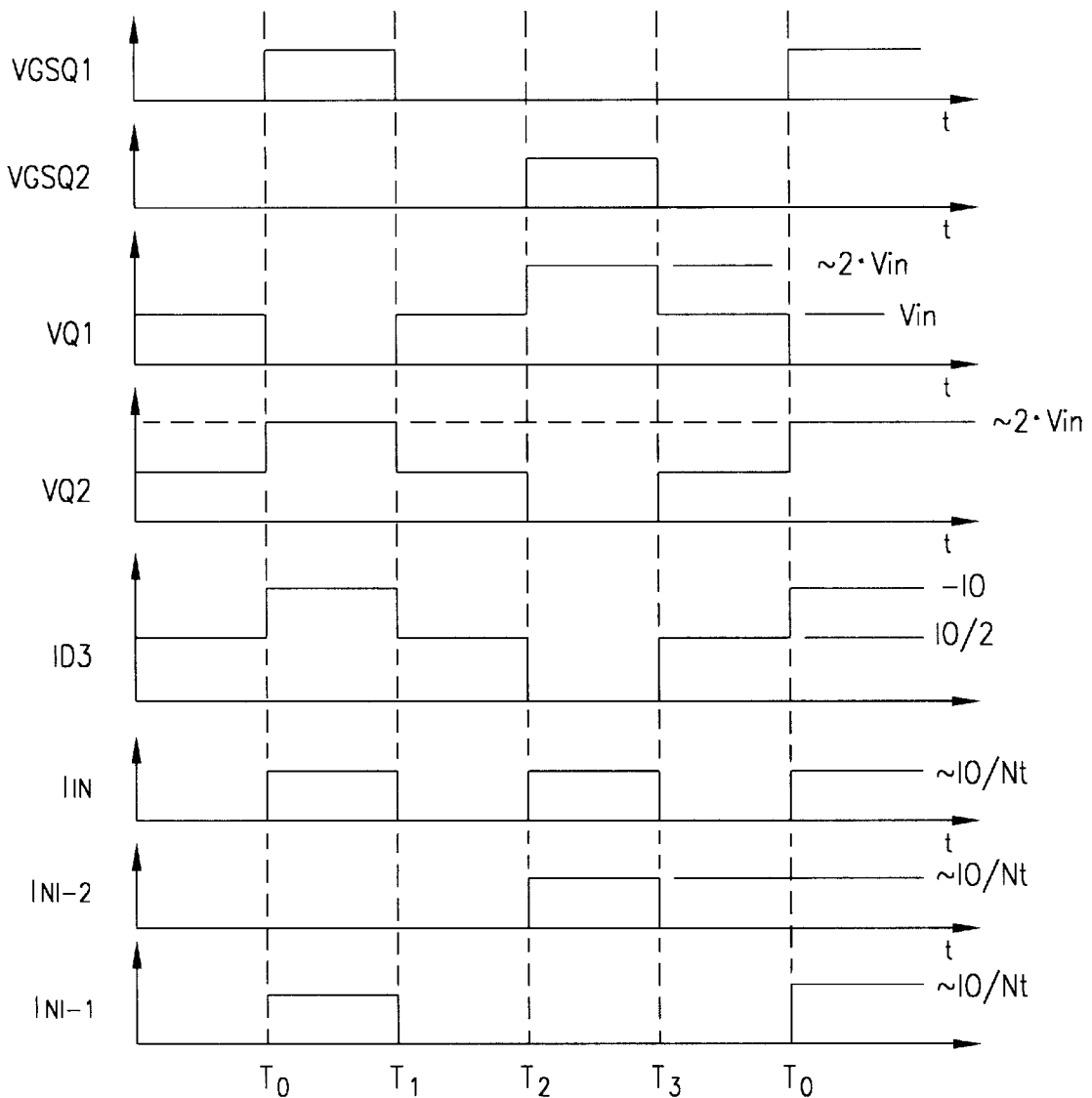
FIG. 4 is a graph of wave forms describing the operation of the push-pull converter of FIG. 2, where the clamp capacitor has a relatively small capacitance.

Referring now to FIG. 4, there are illustrated wave forms for the push-pull converter 200 where the capacitance of the clamp capacitor CC is relatively small (around 0.1 $\mu$F for a 100 KHz switching frequency). The clamp capacitor CC is charged and discharged within a fraction of a switching cycle and the current through the primary winding of the transformer N1-1, N1-2 (represented by wave forms IN1-1, IN1-2) and the input current (represented by wave form IIN) are like the ones in conventional push-pull converters. It should be understood that the current through the clamp capacitor CC for this case, measured in root mean square, is a fraction of an amp.

Figure 5:
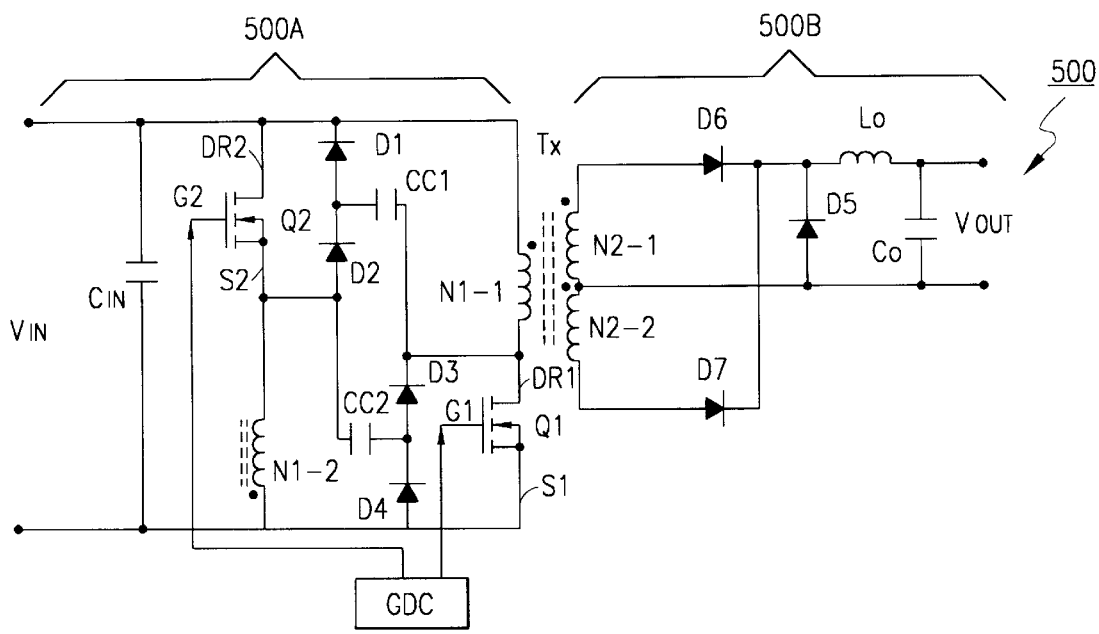
FIG. 5 is a diagram of a push-pull converter in accordance with an alternative embodiment of the present invention.

Referring now to FIG. 5, there is illustrated a push-pull converter, generally designated by the reference numeral 500, in accordance with an alternate embodiment of the present invention. The push-pull converter 500 includes a primary circuit 500A and an output section 500b. The primary circuit 500A includes an input terminal VIN connectable to an input voltage. An input capacitor CIN is placed across the input terminal VIN to filter the input. Additionally the primary circuit 500A includes a first switch Q1 connected in series to a first primary winding of a transformer N1-1 connected across the input terminal VIN and a second switch Q2 connected in series with a second primary winding of a transformer N1-2 also connected across the input terminal VIN. The first and second switches Q1 and Q2 and the first and second primary windings of transformer N1-1, N1-2 are disposed such that first switch Q1 is diagonally opposite the second switch Q2 and the first primary winding of transformer N1-1 is diagonally opposite the second primary winding of transformer N1-2.

The coupling coefficient of the primary windings of transformers N1-1, N1-2 are less than one, preferably, but not limited to 0.25–0.75, in order for the operational voltage of the clamp capacitors to be less than the input voltage. Consequently, the clamping voltage seen by the primary switches Q1, Q2 is less than twice the input voltage. Allowing for a reduced voltage stress in the primary switches Q1, Q2 is important for typical telecommunications applications where the input voltage range is from 36 V to 72 V. By selecting the appropriate coupling coefficient of the primary windings of transformer N1-1, N1-2, the voltage stress in the primary switches can be limited to less than 120 V to take advantage of standard, readily available 150 V semiconductor devices.

Each switch includes a respective gate terminal G1, G2, a source terminal S1, S2 and a drain terminal DR1, DR2. A voltage is applied across the gate G1, G2 and drain terminals DR1, DR2 by a gate drive circuit GDC. As discussed hereinbefore, the gate drive circuit applies a square wave with less than 50% duty cycle to each switch Q1, Q2, where the square wave applied to Q2 is 180 degrees out of phase with the square wave applied across Q1.

A first clamp capacitor CC1 and a diode D1 are connected to the source S of the switch Q2. A second clamp capacitor CC2 and diode D2 are connected to the drain DR1 of switch Q1, where the second clamp capacitor CC2 is connected to D1 and the first clamp capacitor CC1 is connected to D2. Additionally, diode D3 connects clamp capacitor CC1 and diode D2 to ground, while diode D4 connects clamp capacitor CC2 and diode D1 to VIN.

The output section 500B includes diodes D5, D6, D7 and secondary windings N2-1, N2-2. Diode D6 is connected in series with secondary winding N2-1 while diode D7 is connected in series with secondary winding N2-2, such that the series pair D7 and N2-2 is in parallel with the series pair D6 and N2-1. Each primary N1-1, N1-2 is reset during both the lagging dead time stage (the dead time stage immediately preceding the power stage for the switch connected to the primary winding) as well as the complementary powering stage (the powering stage of the switch across the primary winding), in contrast with conventional converters in which the reset only occurs during the complementary powering stage. Therefore, the voltages of the primary windings N1-1, N1-2 do not both reach zero during the dead time stage. Consequently, an additional diode D5 is placed in parallel with the series pair D6 and N2-1 and with the series pair D7 and N2-2. The output section 500B also includes an inductor LO and an output capacitor CO as an LC filter network, such that output capacitor CO is connected across output terminal VO.

Figure 6:
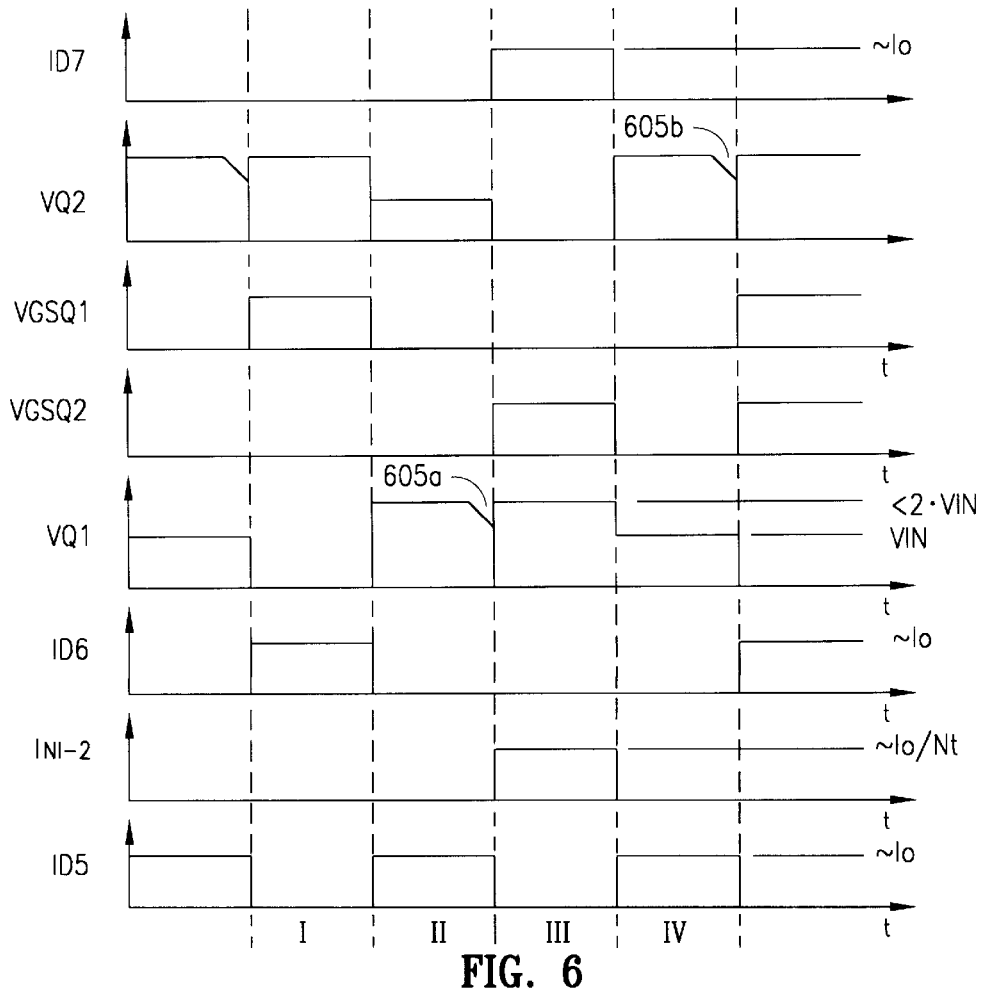
FIG. 6 is a graph of waveforms describing the operation of the push-pull converter of FIG. 5.

Referring now to FIG. 6, there are illustrated waveforms describing the operation of the push pull converter 500 of FIG. 5. As noted above, a voltage is applied across the respective gates G1, G2 and drain terminals DR1, DR2 by a gate drive circuit GDC. The operation of the GDC can be characterized by four repeating phases, or quadrants I, II, III, IV, as illustrated in FIG. 6.

During quadrant I, for example, a drive voltage is applied to across the gate G1 and the source S1 of the first switch Q1 (represented by waveform VGSQ1). While the driving pulse is applied to Q1, current flows through primary winding N1-1, thereby inducing a current in the secondary winding N2-1. Diode D6 is forward biased allowing current to flow (represented by waveform ID6). Additionally, the primary winding N1-2 is reset during this stage. While the primary winding N1-2 is reset, the clamping capacitors CC1, CC2 regulate the voltage stress across the second switch Q2 (represented by waveform VQ2) to less than twice the input voltage. The reset time for the primary winding N1-2 is slower because the voltage across the second switch Q2 is regulated. Therefore, the primary winding N1-2 does not completely reset during quadrant I, in contrast to conventional converters.

Quadrant II is a dead time stage where the GDC does not apply a drive voltage to either switch Q1, Q2, and current flows through diode D5 (represented by waveform ID5 where IO represents the steady-state current in the output capacitor CO). It is noted that a notch 605a in the voltage of VQ1 appears towards the end of the reset. The notch 605a is due to the partial resonance of the magnetizing inductance and the output capacitance of the primary switches Q1, Q2. The notch 605a tends to disappear the lower the value of the coupling coefficient and clamp capacitor.

During quadrant III, a drive voltage is applied across the gate G2 and the source S2 of the second switch Q2 (represented by waveform VGSQ2). While the driving pulse is applied to switch Q2, current flows through the primary winding N1-2 (represented by waveform IN1-2, where Nt represents the effective turns ratio between the primary windings N1-1, N1-2 and the secondary windings N2-1, N2-2), thereby inducing a current in the secondary winding N2-2. Diode D7 is forward biased allowing current to flow (represented by waveform ID7). Additionally, the primary winding N1-1 resets during this stage. While the primary winding N1-1 resets, the clamping capacitors C11, C12 regulate the voltage stress across the second switch Q1 (represented by waveform VQ1) to less than twice the input voltage. The reset time for the primary winding N1-1 is longer because the voltage across the second switch Q1 is regulated. Therefore, the primary winding N1-1 does not completely reset during quadrant III in contrast to conventional converters.

Quadrant IV is a dead time stage where the GDC does not apply a drive voltage to either switch Q1, Q2, and current flows through diode D5. As with VQ1, a notch 605b appears in the voltage of VQ2 towards the end of the reset. The notch 605b is due to the partial resonance of the magnetizing inductance and the output capacitance of the primary switches Q1, Q2. The notch 605b tends to disappear the lower the value of the coupling coefficient and clamp capacitor.

Figure 7:
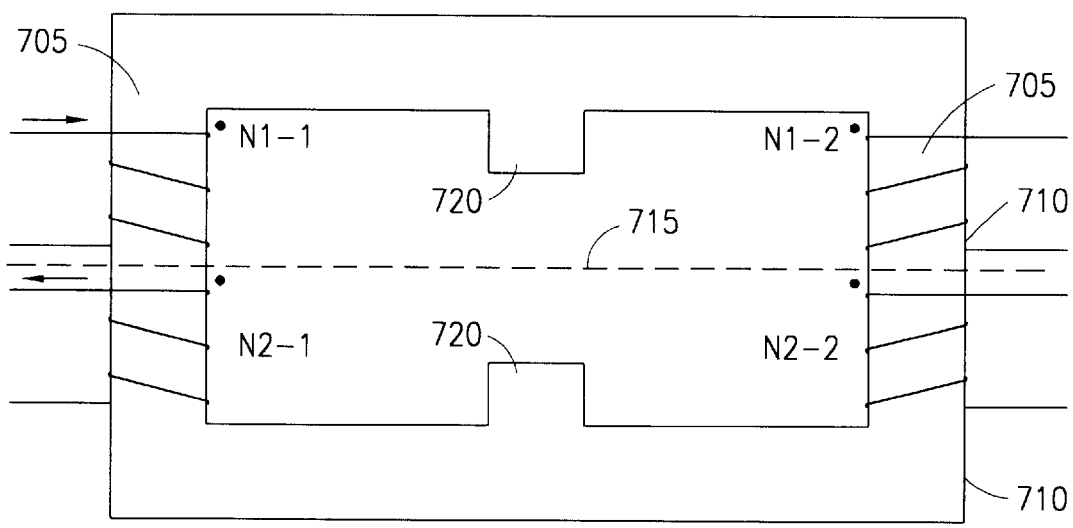
FIG. 7 is a block diagram of a transformer for use in the push-pull converter of FIG. 5.

Referring now to FIG. 7, there is illustrated a diagram of an exemplary implementation of the primary windings N1-1, N1-2 and secondary windings N2-1, N2-2 in accordance with the principals of the present invention. The primary windings N1-1, N1-2, and corresponding secondary windings N2-1, N2-2 are wound about the outside legs 705 of an E-type transformer structure 710. Winding the primary windings N1-1, N1-2 and corresponding secondary windings N2-1, N2-2 about the outside legs of the E-type transformer structure 710 allows for the secondary windings N2-1, N2-2 to be tightly coupled to the respective primary windings N1-1, N1-2 and still allow for the voltage in primary winding N1-1 and primary N1-2 to be different from one another. The coupling coefficient can be controlled by varying the gap 715 in the center leg 720 or outside legs 705. Increasing the gap 715 in the center leg 710 increases the coupling coefficient between the primary windings N1-1, N1-2. Increasing the gap 715 in the outside legs 705 decreases the coupling coefficient between the primary windings N1-1, N1-2.

Although the invention has been described with a certain degree of particularity, it should be recognized that elements thereof may be altered by persons skilled in the art without departing from the spirit and scope of the invention. Therefore, the invention is limited only by the following claims and their equivalents.

What is claimed is:

1. A push-pull converter for converting a predetermined input voltage received across an input comprising a first input terminal and a second input terminal to a selectable output voltage at an output terminal, said push-pull converter comprising:

a first switch having a first terminal connected to said first input terminal and a second terminal;

a transformer comprising a first primary winding having a first terminal connected to said second terminal of the first switch and a second terminal connected to said second input terminal, and a second primary winding having a first terminal connected to the first input terminal and a second terminal;

a second switch having a first terminal connected to said second input terminal and a second terminal connected to the second terminal of the second primary winding;

a control circuit having a first output connected to a control terminal of said first switch and a second output connected to a control terminal of said second switch, for cyclically activating said first and said second switches; and a capacitor having a first terminal connected to said second terminal of said first switch and a second terminal connected to said second terminal of said second switch, for clamping a voltage across said first and said second switches to approximately twice said predetermined input voltage when said second and said first switches are activated, respectively.

2. The push-pull converter of claim 1 wherein said first switch comprises a transistor.

3. The push-pull converter of claim 2, wherein said first switch comprises a metal oxide semiconductor field effect transistor (MOSFET).

4. The push-pull converter of claim 1, wherein said second primary winding is magnetically coupled to an output section, said output section comprising said output terminal.

5. The push-pull converter of claim 4, wherein said output section comprises a first secondary winding magnetically coupled to said second primary winding.

6. The push-pull converter of claim 1, wherein said capacitor has a capacitance exceeding 5 microfarads.

7. The push-pull converter of claim 1, wherein said capacitor has a capacitance less than 5 microfarads.

8. A push-pull converter for converting a predetermined input voltage received across an input comprising a first terminal and a second terminal to a selectable output voltage at an output terminal, said push-pull converter comprising:

a first switch connected to said first terminal;

a transformer comprising a first primary winding, a second primary winding and at least one secondary winding coupled to the output terminal, said first primary winding being connected to said first switch and said second terminal and said second primary winding being connected to said first terminal;

a second switch connected to said second terminal and said second primary winding;

a first diode connected to the first switch;

a first clamp capacitor connected to the first diode and further connected to the second switch;

a second diode connected to the second switch; and a second clamp capacitor connected to the second diode and further connected to the first switch.

9. The push-pull converter of claim 8, further comprising a third diode connected to said first diode and said first terminal.

10. The push-pull converter of claim 8, further comprising a fourth diode connected to said second diode and said second terminal.

11. The push-pull converter of claim 8, wherein said first switch comprises a transistor.

12. The push-pull converter of claim 11, wherein said first switch comprises a metal oxide semiconductor field effect transistor (MOSFET).

13. The push-pull converter of claim 8, wherein said at least one secondary winding is magnetically coupled to said first primary winding.

14. The push-pull converter of claim 13, further comprising:

rectifying circuitry connected between said at least one secondary winding and said output terminal.

15. The push-pull converter of claim 13, wherein said rectifying circuitry comprises a fifth diode, said fifth diode conducting current during a dead time stage.

16. The push-pull converter of claim 8, further comprising:

a control circuit having a first output connected to a control terminal of said first switch and a second output connected to a control terminal of said second switch, for cyclically activating said first and said second switches so that each of said first and said second switches transfers energy to said output terminal when activated.

17. A push-pull converter for converting a predetermined input voltage received across a first input terminal and a second input terminal into an output voltage level appearing at an output terminal, said push-pull converter comprising:

a transformer comprising a first primary winding, a second primary winding and at least one secondary winding coupled to said first primary winding, said at least one secondary winding being further coupled to said output terminal;

a first switch series connected with said first primary winding between said first and said second input terminals, a first node connecting said first switch and said first primary winding;

a second switch series connected with said second primary winding between said first and said second input terminals, a second node connecting said second switch and said second primary winding;

a control circuit which generates first and second control signals for sequentially switching said first and said second switches between conductive and non-conductive states; and a capacitor connected between said first and said second nodes, said capacitor clamping a voltage of approximately twice the predetermined input voltage across said first and said second switches when said second and said first switches are activated, respectively.

18. The push-pull converter of claim 17, wherein:

each of said first and said second switches comprises a MOS transistor.

19. The push-pull converter of claim 17, wherein:

said capacitor is sized for being charged by a first substantially constant current when said control circuit deactivate said first and said second switches, and discharged by a second substantially constant current when said control circuit activates either of said first and said second switches.

* * * * *

US006166927C1

(12) EX PARTE REEXAMINATION CERTIFICATE (5043rd)

United States Patent
Farrington et al.

(10) Number: US 6,166,927 C1
(45) Certificate Issued: Dec. 21, 2004

(54) PUSH-PULL POWER CONVERTER CIRCUIT

(75) Inventors: Richard W. Farrington, Heath, TX (US); William Hart, Plano, TX (US)

(73) Assignee: Ericsson Inc., Research Triangle Park, NC (US)

Reexamination Request:
No. 90/006,316, Jun. 27, 2002

Reexamination Certificate for:
Patent No.: 6,166,927
Issued: Dec. 26, 2000
Appl. No.: 09/361,023
Filed: Jul. 23, 1999

(51) Int. Cl.[7] .............................................. H02M 3/335
(52) U.S. Cl. ......................................................... 363/25
(58) Field of Search .............................. 363/24, 25, 26

(56) References Cited

PUBLICATIONS

Herbert, "Design and Application of Matrix Transformers and Symmetrical Converters", Fifth International High Frequency Power Conversion Conference '90, May 11, 1990, pp. 10–11 140–144.*

Author: Edward Herbert, Title: Design and Application of Matrix Transformers and Symmetrical Converters, Pages and Revision Dates: 9: Apr. 13, 1990, 10: Apr. 13, 1990, 11: Apr. 13, 1990, 59: Apr. 18, 1990, 140: Apr. 20, 1990, 141: May 6, 1989, 142: May 6, 1989, A Seminar Presented at the Fifth International High Frequency Power Convention Confeence 1990, Santa Clara, May 11, 1990, Publisher: FMTT, Inc., Location of Publication: Canton, Connecticut.

* cited by examiner

Primary Examiner—Jeffrey Sterrett

(57) ABSTRACT

A push-pull converter for converting an input voltage to a selectable output voltage is disclosed. The push-pull converter includes a pair of primary switches and a pair of primary windings of a transformer. The voltage stress across the primary switches is regulated by means of a clamp capacitor. The clamp capacitor clamps the voltage of the primary switches during the reset of the primary windings of the transformer. An alternate embodiment is also disclosed in which the voltage stress across the primary switches is regulated by means of two clamp capacitors. The clamp capacitor clamps the voltage of the primary switches during the reset of the primary windings of the transformer. The clamp capacitors extend the transformer reset period to include the lagging dead time for the corresponding switches, as well as the complementary powering stage. Current in the output section during the dead times is permitted by means of an additional diode, therein.

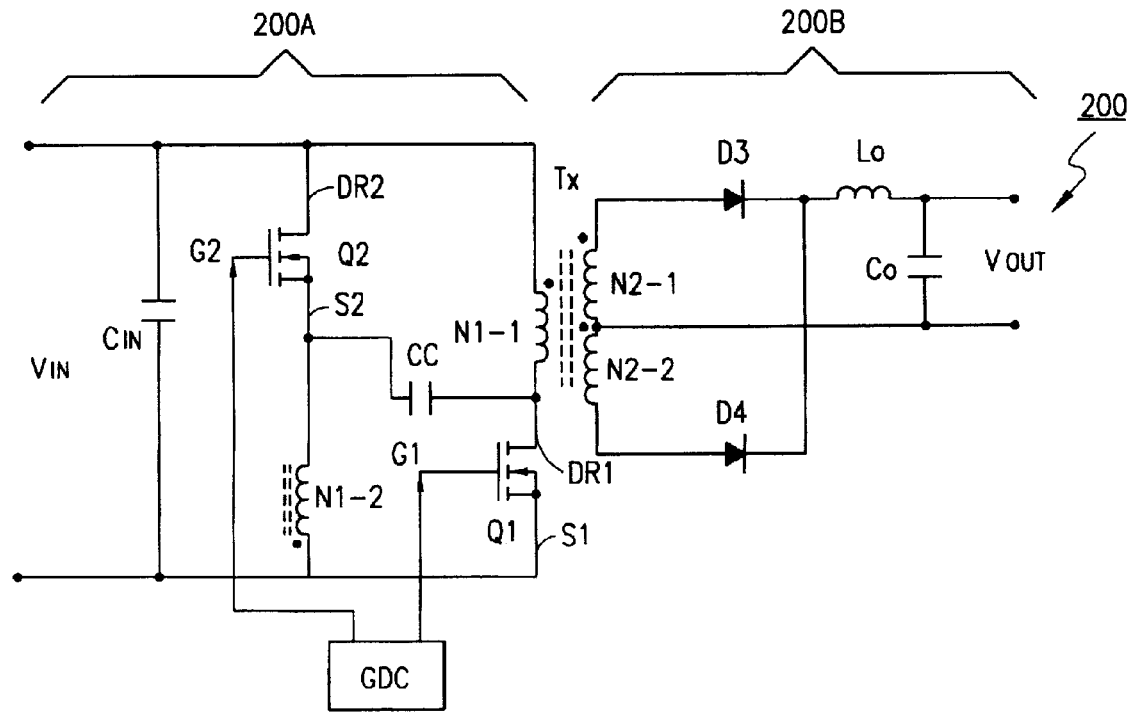

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8 and 17 are determined to be patentable as amended.

Claims 2–7, 9–16 and 18–19, dependent on an amended claim, are determined to be patentable.

1. A push-pull converter for converting a predetermined input voltage received across an input comprising a first input terminal and a second input terminal to a selectable output voltage at an output terminal, said push-pull converter comprising:
   a first switch having a first terminal *directly* connected to said first input terminal and a second terminal;
   a transformer comprising a first primary winding having a first terminal connected to said second terminal of the first switch and a second terminal connected to said second input terminal, and a second primary winding having a first terminal connected to the first input terminal and a second terminal;
   a second switch having a first terminal *directly* connected to said second input terminal and a second terminal connected to the second terminal of the second primary winding;
   a control circuit having a first output connected to a control terminal of said first switch and a second output connected to a control terminal of said second switch, for cyclically activating said first and said second switches; and
   a capacitor having a first terminal connected to said second terminal of said first switch and a second terminal connected to said second terminal of said second switch, for clamping a voltage across said first and said second switches to approximately twice said predetermined input voltage when said second and said first switches are activated, respectively.

8. A push-pull converter for converting a predetermined input voltage received across an input comprising a first terminal and a second terminal to a selectable output voltage at an output terminal, said push-pull converter comprising:
   a first switch *directly* connected to said first terminal;
   a transformer comprising a first primary winding, a second primary winding and at least one secondary winding coupled to the output terminal, said first primary winding being connected to said first switch and said second terminal and said second primary winding being connected to said first terminal;
   a second switch *directly* connected to said second terminal and said second primary winding;
   a first diode connected to the first switch;
   a first clamp capacitor connected to the first diode and further connected to the second switch;
   a second diode connected to the second switch; and
   a second clamp capacitor connected to the second diode and further connected to the first switch.

17. A push-pull converter for converting a predetermined input voltage received across a first input terminal and a second input terminal into an output voltage level appearing at an output terminal, said push-pull converter comprising:
    a transformer comprising a first primary winding, a second primary winding and at least one secondary winding coupled to said first primary winding, said at least one secondary winding being further coupled to said output terminal;
    a first switch series connected with said first primary winding between said first and said second input terminals, *said first switch being directly connected to said first input terminal,* a first node connecting said first switch and said first primary winding;
    a second switch series connected with said second primary winding between said first and said second input terminals, *said second switch being directly connected to said second input terminal,* a second node connecting said second switch and said second primary winding;
    a control circuit which generates first and second control signals for sequentially switching said first and said second switches between conductive and non-conductive states; and
    a capacitor connected between said first and said second nodes, said capacitor clamping a voltage of approximately twice the predetermined input voltage across said first and said second switches when said second and said first switches are activated, respectively.

\* \* \* \* \*